US012023530B2

(12) United States Patent
Voss et al.

(10) Patent No.: US 12,023,530 B2
(45) Date of Patent: Jul. 2, 2024

(54) STRUCTURAL POST FOR FALL ARREST AND ROPE ACCESS

(71) Applicant: SAYFA R&D PTY LTD, Boronia (AU)

(72) Inventors: Murray Voss, Boronia (AU); Barry Voss, Boronia (AU)

(73) Assignee: SAYFA R&D PTY LTD, Boronia (AU)

( * ) Notice: Subject to any disclaimer, the term of this patent is extended or adjusted under 35 U.S.C. 154(b) by 321 days.

(21) Appl. No.: 17/450,087

(22) Filed: Oct. 6, 2021

(65) Prior Publication Data

US 2022/0280818 A1 Sep. 8, 2022

Related U.S. Application Data

(63) Continuation of application No. PCT/AU2021/051002, filed on Aug. 30, 2021.

(30) Foreign Application Priority Data

Mar. 5, 2021 (AU) ................................ 2021101176

(51) Int. Cl.
*A62B 35/00* (2006.01)
*E04G 21/32* (2006.01)

(52) U.S. Cl.
CPC ...... *A62B 35/0068* (2013.01); *E04G 21/3261* (2013.01)

(58) Field of Classification Search
CPC . A62B 35/00; A62B 35/0006; A62B 35/0018; A62B 35/0025; A62B 35/0037;
(Continued)

(56) References Cited

U.S. PATENT DOCUMENTS 4,085,557 A * 4/1978 Tharp ............... E04F 15/02423 52/801.1
4,578,910 A * 4/1986 Germeroth ........ E04F 15/02452 24/DIG. 54

(Continued)

FOREIGN PATENT DOCUMENTS

AU 2008100070 A 2/2008
DE 202012010035 2/2013

(Continued)

OTHER PUBLICATIONS

International Search Report & Written Opinion dated Nov. 8, 2021 from PCT Application No. PCT/AU2021/051002.

(Continued)

*Primary Examiner* — Chi Q Nguyen
(74) *Attorney, Agent, or Firm* — INNOVATION CAPITAL LAW GROUP, LLP; Vic Lin

(57) ABSTRACT

A structural post for fall arrest and rope access has a baseplate having baseplate fixing holes. A vertical mast is attached to an upper surface of the baseplate, and a main attachment plate comprising main attachment plate fixing holes is affixed to an upper end of the mast. The structural post may be mounted to concrete floor garden landscapes, steel structures and the like on high-rise buildings, for fall arrest and rope access, and which facilitates versatility and adaptability for various locations and applications, for construction, beside cleaning and other building and maintenance activities.

28 Claims, 12 Drawing Sheets

(58) Field of Classification Search
CPC ............ A62B 35/0043; A62B 35/0062; A62B 35/0068; A62B 35/0075; A62B 35/0081; A62B 35/0087; A62B 35/0093; A62B 35/04; E04G 21/3261; E04G 21/3276; E04G 21/3285; E04G 21/3295
See application file for complete search history.

(56) References Cited

U.S. PATENT DOCUMENTS

| | | | | |
|---|---|---|---|---|
| 4,922,670 | A * | 5/1990 | Naka | E04F 15/02458 52/126.6 |
| 4,996,804 | A * | 3/1991 | Naka | E04F 15/02482 52/126.6 |
| 5,011,106 | A | 4/1991 | Cody | |
| 5,317,855 | A * | 6/1994 | De Leeuw | E04G 25/061 248/354.3 |
| 5,388,666 | A * | 2/1995 | Schworer | E04G 7/307 182/186.6 |
| 5,603,187 | A * | 2/1997 | Merrin | F24S 25/61 52/90.2 |
| 7,165,361 | B2 * | 1/2007 | Vanagan | E04G 11/48 248/354.3 |
| D593,243 | S * | 5/2009 | Flaherty | D26/68 |
| 7,650,726 | B2 * | 1/2010 | Jakob-Bamberg | E04B 5/48 52/220.1 |
| 8,938,918 | B2 * | 1/2015 | Ruland | E04F 15/02447 52/126.5 |
| 9,010,487 | B2 * | 4/2015 | Cruz | E04G 21/3276 182/3 |
| 9,382,722 | B2 * | 7/2016 | Banyi | E04H 12/2292 |
| 9,951,528 | B2 * | 4/2018 | Kugler | E04F 15/0247 |
| 10,266,993 | B2 * | 4/2019 | Szekely | E01C 5/006 |
| 10,407,852 | B2 * | 9/2019 | Dickinson | F41H 11/08 |
| 10,508,459 | B2 * | 12/2019 | Sargent | E04G 21/3204 |
| 10,767,323 | B2 * | 9/2020 | Connell | E01C 11/005 |
| 2001/0032435 | A1 | 10/2001 | Austin | |
| 2002/0100636 | A1 | 8/2002 | Cole | |
| 2002/0189901 | A1 | 12/2002 | Cole | |
| 2005/0124190 | A1 * | 6/2005 | Mead | H01R 4/64 439/92 |
| 2005/0285011 | A1 * | 12/2005 | Harwood | E04H 12/2261 248/519 |
| 2006/0109667 | A1 * | 5/2006 | Flaherty | E01F 9/617 362/431 |
| 2008/0184633 | A1 * | 8/2008 | Hamilton | E02D 27/42 52/127.12 |
| 2010/0232876 | A1 * | 9/2010 | Ringelberg | E01F 13/028 404/9 |
| 2012/0073900 | A1 * | 3/2012 | Cruz | E04G 21/3276 182/3 |
| 2015/0082719 | A1 * | 3/2015 | Takahashi | E04B 1/58 52/298 |
| 2019/0136470 | A1 * | 5/2019 | Dickinson | E01F 13/12 |

FOREIGN PATENT DOCUMENTS

| | | | |
|---|---|---|---|
| IT | PR20090074 | A1 | 3/2011 |
| IT | FI20110258 | A1 | 6/2013 |
| IT | MI20121667 | A1 | 4/2014 |

OTHER PUBLICATIONS

Search Report dated Mar. 28, 2022 from United Kingdom Application No. GB2114058.7.
Australian Examination Report dated Jun. 3, 2021 from Australian Application No. AU2021101176.

* cited by examiner

STRUCTURAL POST FOR FALL ARREST AND ROPE ACCESS

FIELD OF THE INVENTION

This invention relates generally to a heavy duty elevated structural post for fall arrest and rope access applications.

SUMMARY OF THE DISCLOSURE

There is provided herein a structural post which may be mounted to concrete floor garden landscapes, steel structures and the like on high-rise buildings, for fall arrest and rope access, and which facilitates versatility and adaptability for various locations and applications, for construction, beside cleaning and other building and maintenance activities.

The structural post comprises a baseplate comprising baseplate fixing holes and a vertical mast attached to an upper surface of the baseplate. The structural post further comprises a main attachment plate comprising main attachment plate fixing holes attached to an upper end of the mast. The structural post may further comprise a quadrant of gusset plates strengthening the vertical mast with respect to the baseplate.

The baseplate is preferably 16 mm thick high-tensile aluminium, continuously welded to the vertical mast for strengthening and comprises 20 mm diameter fixing holes. Furthermore, the vertical mast may be engineered from high-tensile structural aluminium extrusion for superior multi-directional torsional strength, and wherein the present post has been tested to 18 kN in all directions in accordance with AS/NZS 5532:2013.

The main attachment plate is preferably 12 mm thick high tensile aluminium, and continuously welded to the mast for full strength and watertightness. The main attachment plate preferably comprises two 18 mm diameter fixing holes for multiple attachment applications.

The structural post may comprise an adaptor plate which is preferably 20 mm thick mild steel epoxy powder-coated for fixing to the main attachment plate and for attachment of various accessories. The four gusset plates are preferably 10 mm thick high tensile aluminium, and continuously welded to the vertical mast and baseplate for full strength.

The present post may be configured for various applications, including a forged stainless steel dual eye-bolt configuration for fall arrest anchor and rope access applications, having respective ratings of 15 kN for fall arrest and 18 kN for rope access, and wherein no adaptor plate is required.

A further configuration is a static line corner assembly, requiring an adaptor plate and having an 18 kN fall arrest rating.

A yet further configuration is a static line intermediate bracket assembly which comprises an intermediate bracket attached directly to the main attachment plate without an adaptor plate and having an 18 kN fall arrest rating.

A yet further configuration is a static line end stanchion bracket assembly which comprises an end stanchion bracket requiring an adaptor plate and having an 18 kN fall arrest rating.

The vertical mast may have customised height configurations which provide various lengths up to 1000 mm. In embodiments, the mast may be provided in 200 mm increments from 400 mm to 1000 mm.

The baseplate may be mechanically or chemically affixed to a pre-existing concrete plinth or slab, or alternatively attached to a cast-in anchor cage which is pre-cast in concrete.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying representation drawings in which.

DESCRIPTION OF EMBODIMENTS

Figure 1:
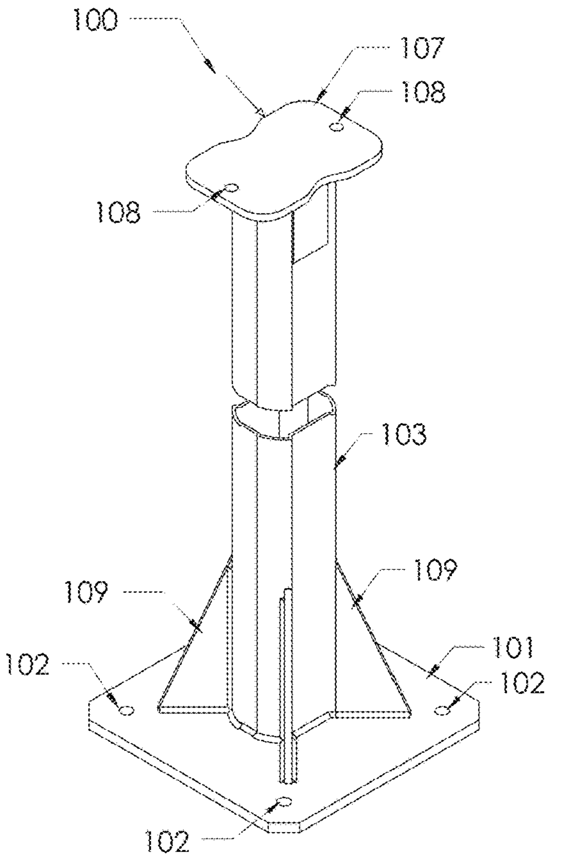
FIG. 1 shows a perspective view of a structural post for fall arrest and rope access in accordance with an embodiment.
Figure 4:
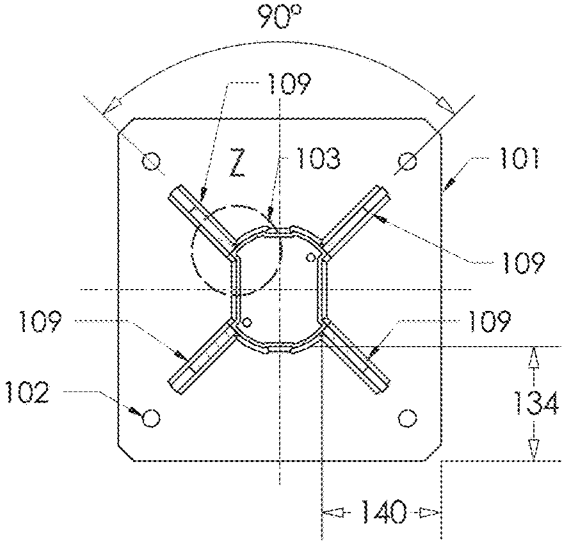
FIG. 4 shows a cross-sectional view of the vertical mast, gusset plates and upper surface of the baseplate of the structural post.

FIG. 1 shows a structural post 100 for fall arrest and rope access. The structural post 100 comprises a baseplate 101 comprising baseplate fixing holes 102. In the embodiment shown in FIG. 4, the baseplate 101 is square and comprises a quadrant of 20 mm diameter fixing holes 102 at respective corners thereof. The baseplate may comprise 16 mm thick high tensile aluminium.

The structural post 100 further comprises a vertical mast 103 attached to an upper surface of the baseplate 101. The vertical mast 103 may be engineered from high-tensile structural aluminium extrusion for superior multi-directional bending and torsional strength both vertically and laterally. The height of the vertical mast 103 may be customised and may provide height options from 400 mm up to 1000 mm in 200 mm increments.

Figure 3:
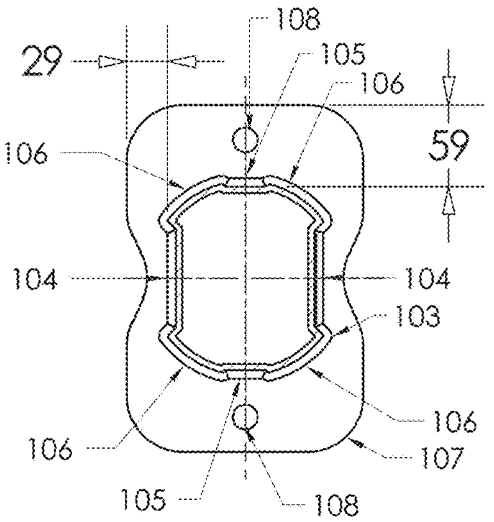
FIG. 3 shows a cross-sectional view of the vertical mast and lower surface of the main attachment plate of the structural post.

Referencing FIG. 3, the vertical mast 103 may comprise symmetrical major planar sides 104, symmetrical minor planar sides 105, and symmetrical rounded corners 106 therebetween. The rounded corners 106 may be concentric and the planar sides 104 and 105 may be recessed therein.

The structural post 100 further comprises a main attachment plate 107 attached to an upper end of the vertical mast 103. The main attachment plate 107 may be parallel with the baseplate 101, to ensure vertical disposition of the structural post 100.

In the embodiment shown in FIG. 3, the main attachment plate 107 comprises two 18 mm diameter fixing holes 108. The main attachment plate 107 may be high-tensile aluminium and welded to the vertical mast 103 for full strength and to form a watertight seal.

Figure 2:
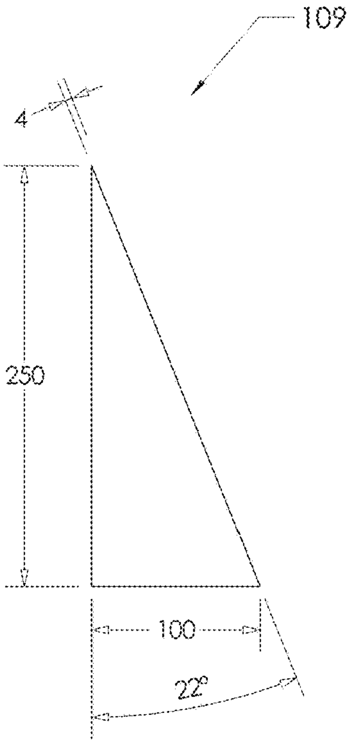
FIG. 2 shows a side elevation view of a gusset plate of the structural post.

The structural post 100 may comprise a quadrant of high-tensile aluminium gusset plates 109 welded to the baseplate at a lower end of the vertical mast 103. Referencing FIG. 2, the gusset plates 109 may have an approximate height of 250 mm and a base of 100 mm, thereby having an outer edge angled at approximately 22° with respect to the vertical for continuous full-strength welding to the vertical mast 103.

As shown in FIG. 3, the main attachment plate 107 may have greater horizontal cross-section as compared to that of the vertical mast 103, whereby the main attachment plate fixing holes 108 locate outside of the vertical mast 103. In the embodiment shown, the main attachment plate fixing holes 108 are located to extend either side of the symmetrical minor planar sides 105.

Figure 5:
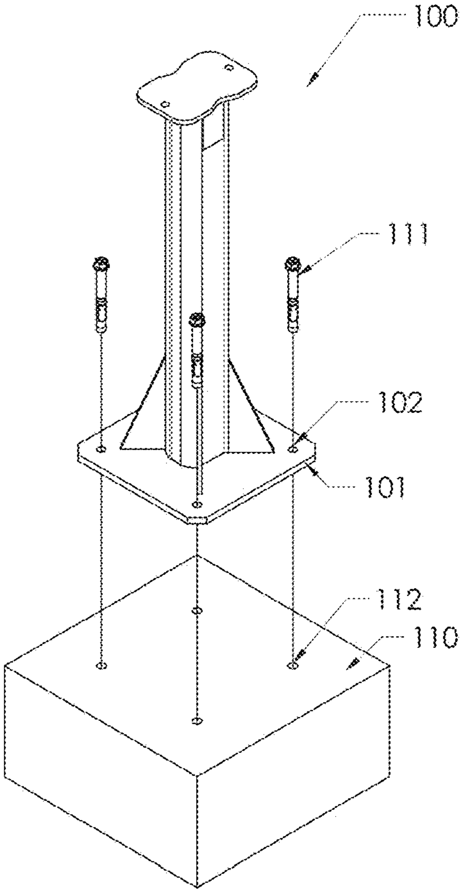
FIGS. 5 and 6 illustrate mounting of the structural post onto a concrete plinths or slab, using high tensile HILTI™ undercut mechanical sleeved anchor bolts.
Figure 6:
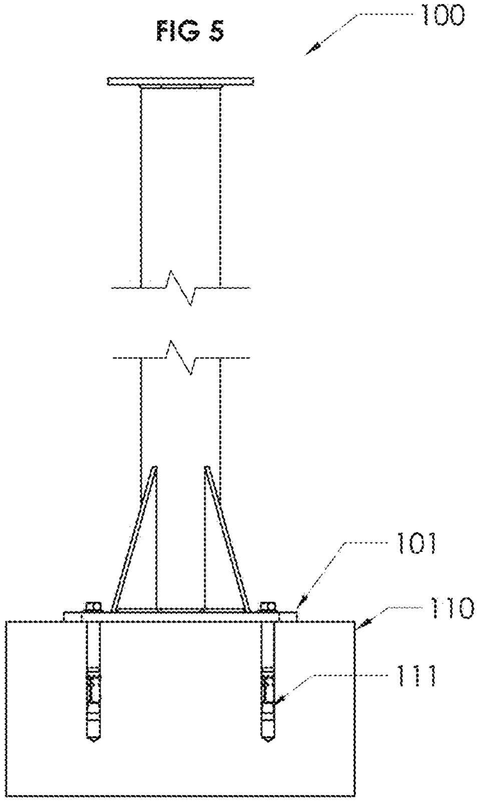

FIGS. 5 and 6 show a first mounting option wherein the structural post 100 is attached to a concrete plinth 110 using HILTI™ M16 undercut mechanical sleeved anchor bolts 111. The plinth 110 is preferably at least 300 mm deep, and four concrete fixing holes 112 are reamed therein according to the manufacturer recommendations, and which align with the baseplate fixing holes 102. The anchor bolts 111 are then inserted through the baseplate fixing holes 102 to anchor the structural post 100 in the manner shown in FIG. 6.

Figure 7:
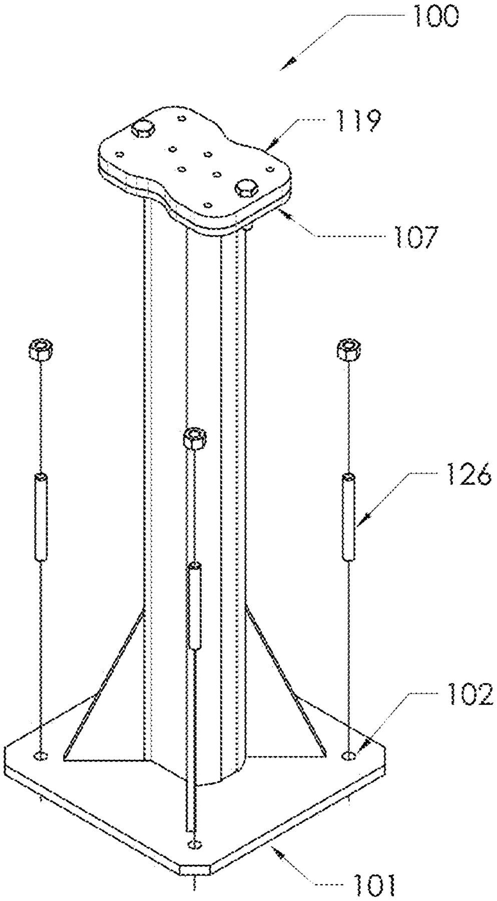
FIGS. 7 and 8 illustrate mounting of the post to a concrete plinth or slab, using the high tensile HILTI™ CHEM-SET™ chemical anchor system.
Figure 8:
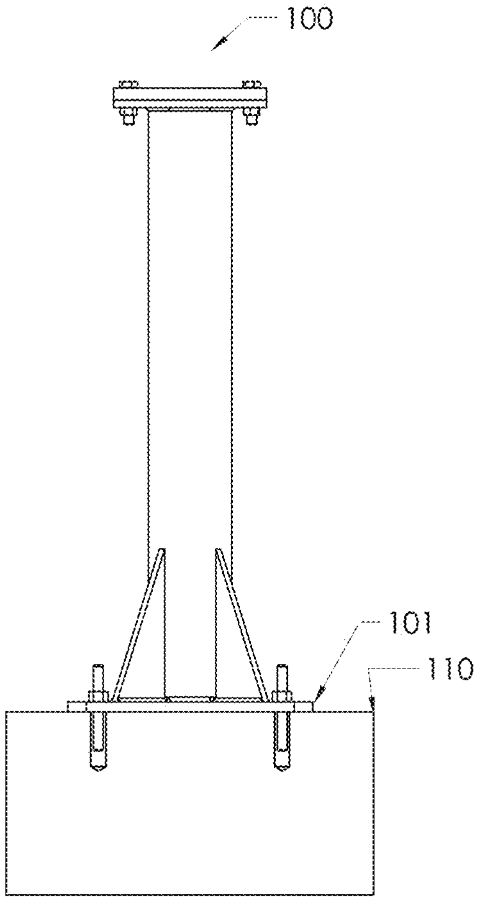

Alternatively, FIGS. 7 and 8 show a second mounting option wherein the structural post 100 is attached to a concrete plinth 110 using HILTI™ HIT-RE 500 V3™ adhesive CHEM-SET™ chemical anchor sleeves and HAS-U A4™ M16×180 anchor rods 126. In accordance with this mounting option, the concrete plinth 110 is preferably is at least 270 mm deep and four fixing holes 112 are similarly reamed into the plinth 110 for the sleeves, and the rods 126 inserted in the manner shown in FIG. 8.

Figure 9:
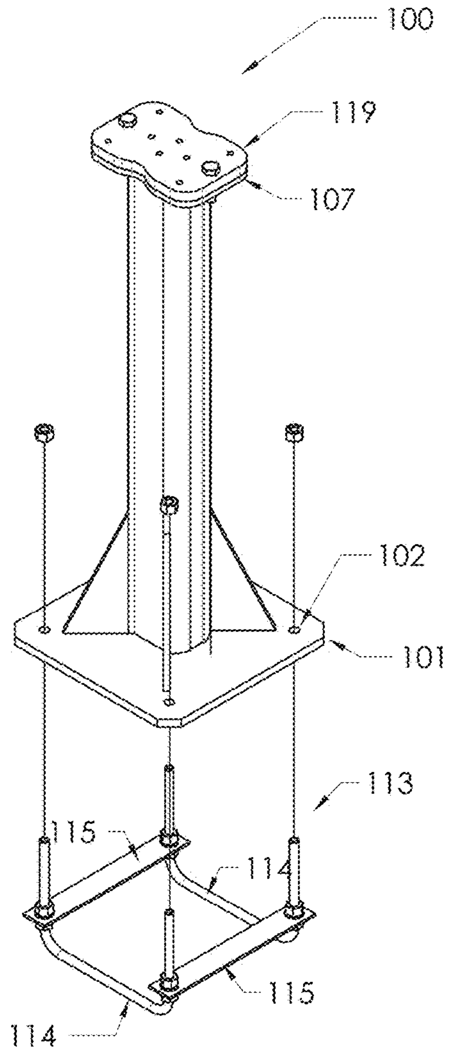
FIGS. 9 and 10 illustrate mounting of the structural post onto a concrete plinth or slab, using a cast-in anchor cage which is pre-cast into concrete.
Figure 10:
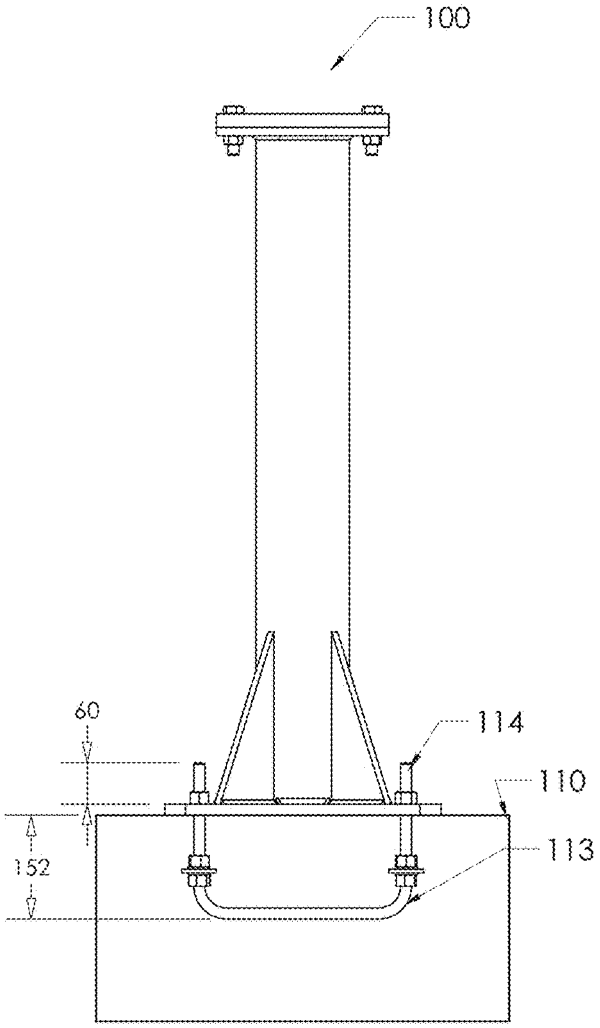

FIGS. 9 and 10 show a further mounting option for the structural post 100, which comprises a cast-in anchor cage 113 which may comprise a pair of U-bolts 114, with a pair of planar anchor plates 115 extending therebetween. The anchor cage 113 is pre-cast into the concrete plinth 110 so that the distal ends of the U-bolts 114 extend therefrom, and are aligned for fixing through the baseplate fixing holes 102 in the manner shown in FIG. 10.

Figure 11:
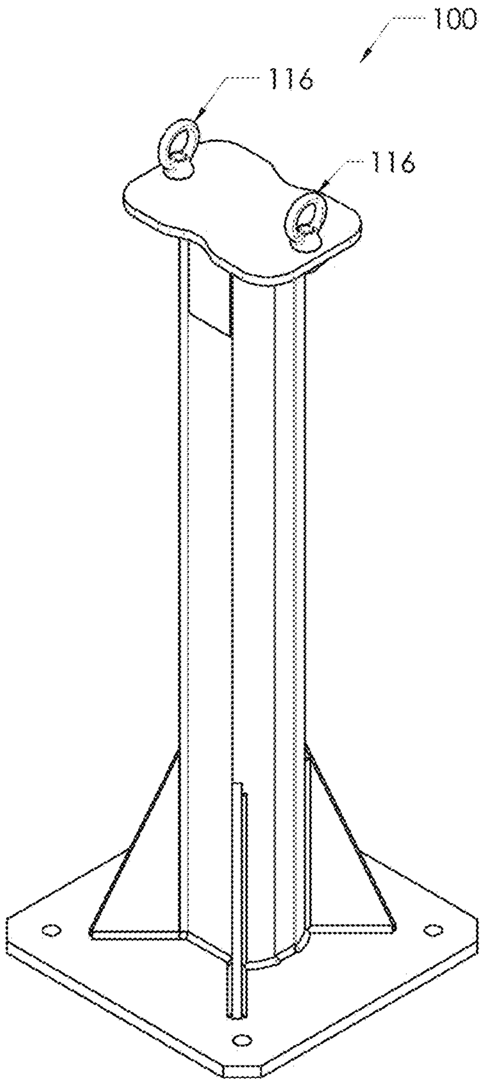
FIGS. 11 and 12 show perspective and assembly views of the forged eye-bolt dual configuration.
Figure 12:
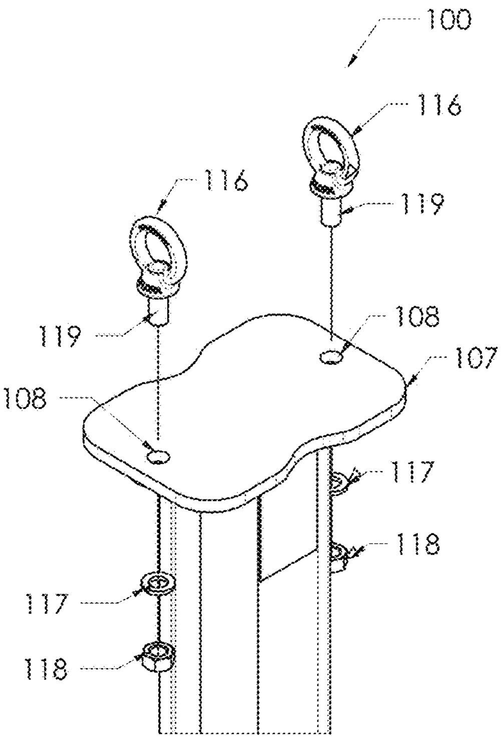
Figure 13:
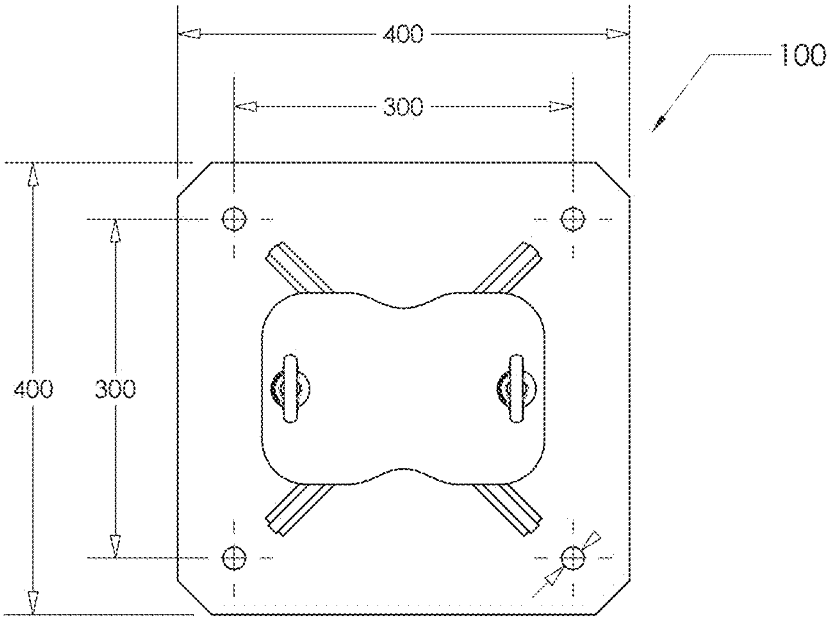
FIGS. 13-15 provide exemplary dimensions of the dual eye-bolt assembly.
Figure 14:
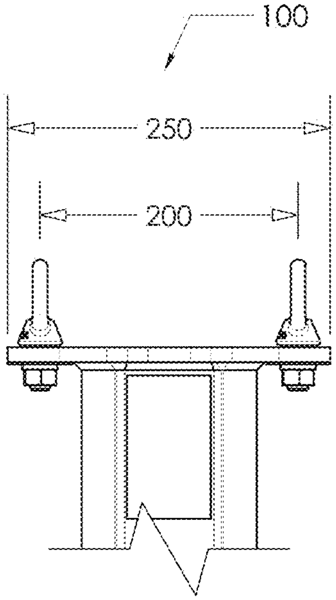
Figure 15:
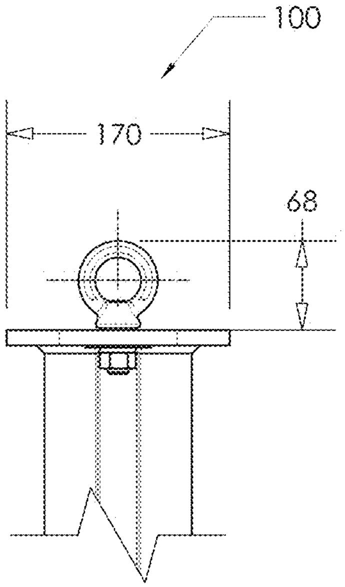

FIGS. 11 and 12 show perspective and assembly views of a dual eye-bolt configuration, wherein a pair of eye-bolts 116 are affixed through the main attachment plate fixing holes 108. High-tensile stainless steel M16 spring washers 117 and M16 hexagonal nuts 118 may secure the threaded stems 119 of the eye-bolts 116, extending through the main attachment plate 107. FIGS. 13-15 provide exemplary dimensions of the dual eye-bolt assembly.

Figure 16:
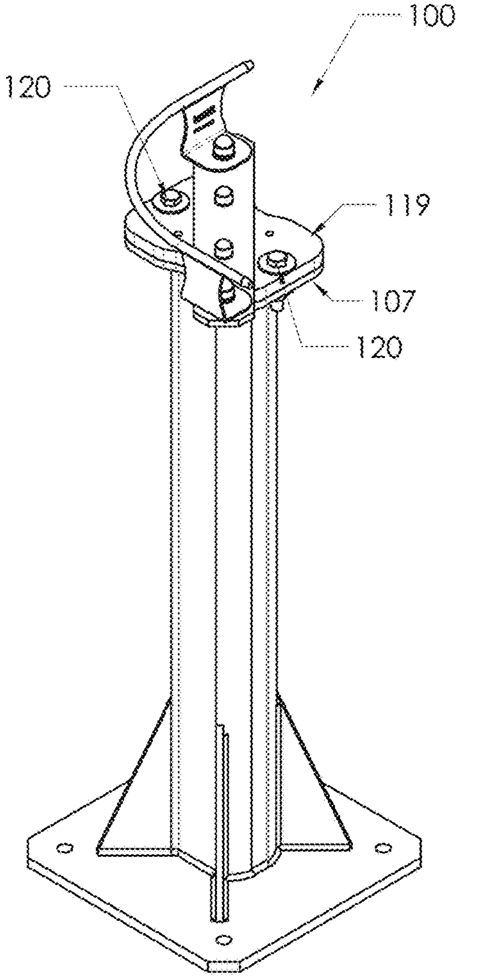
FIGS. 16 and 17 show perspective and assembly views of the static line corner configuration.
Figure 17:
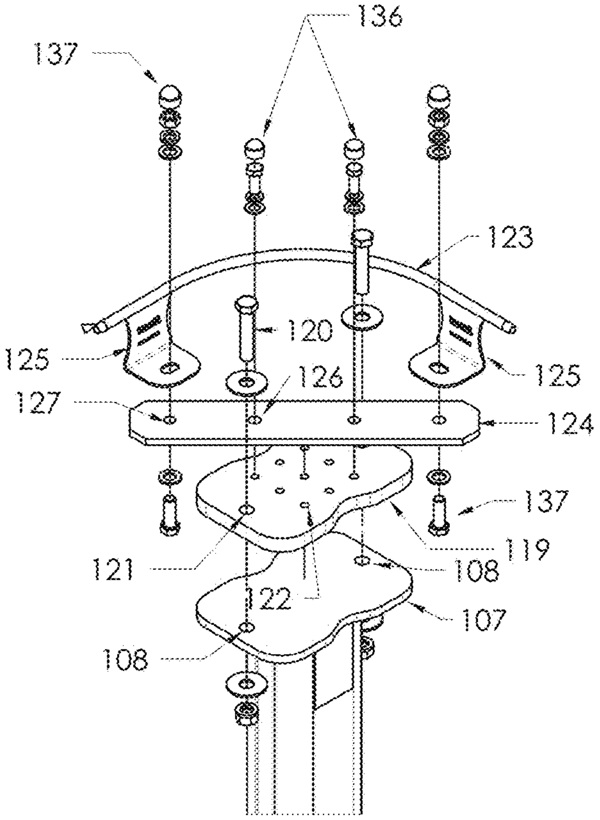

FIGS. 16 and 17 show perspective and arrangement views of a static line corner assembly configuration, wherein the structural post 100 further comprises an adaptor plate 119 which is affixed to the main attachment plate 107.

The adaptor plate 119 may comprise two adaptor plate 18 mm diameter fixing holes 121, corresponding to the two main attachment plate 18 mm diameter fixing holes 108 whereby the adaptor plate 119 can be attached to the main attachment plate 107, using a pair of high-tensile stainless steel M16 fasteners 120 comprising hexagonal bolts and nuts with spring washers protruding through the respective main attachment plate fixing holes 108 and adaptor plate fixing holes 121.

The adaptor plate 119 may further comprise a plurality of accessory pre-threaded fixing holes 122, arranged for the attachment of an accessory to the adaptor plate 119 by means of stainless steel hexagonal set screws and lock washers 136.

In the embodiment shown, the accessory is a static line corner assembly comprising a corner rail 123 bending through approximately 90°, and which is attached to a flat bar 124 via integrally formed right-angled brackets 125.

The flat bar 124 comprises two central fixing holes 126 for attachment to the adaptor plate 119, and two lateral fixing holes 127 for affixing of the right-angled brackets 125 by means of stainless steel hexagonal bolts and nuts, end caps, flat and spring washers 137.

Figure 18:
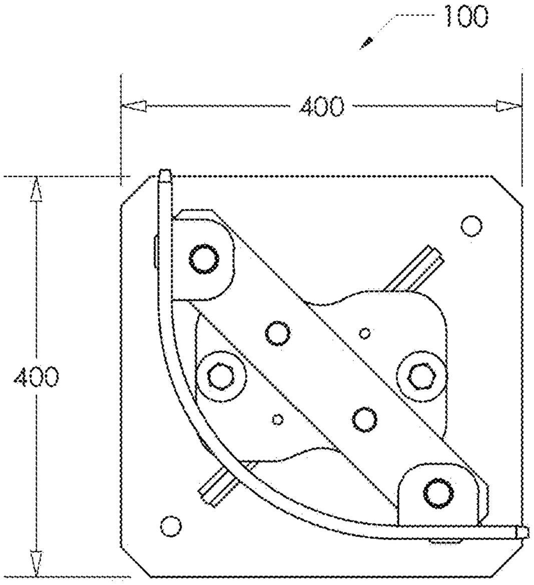
FIGS. 18-20 provide exemplary dimensions of the static line corner assembly.
Figure 19:
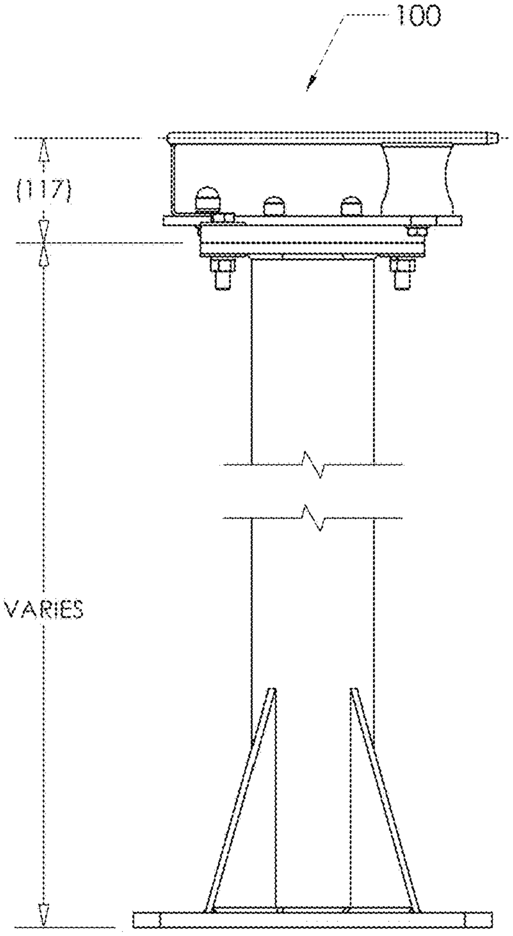
Figure 20:
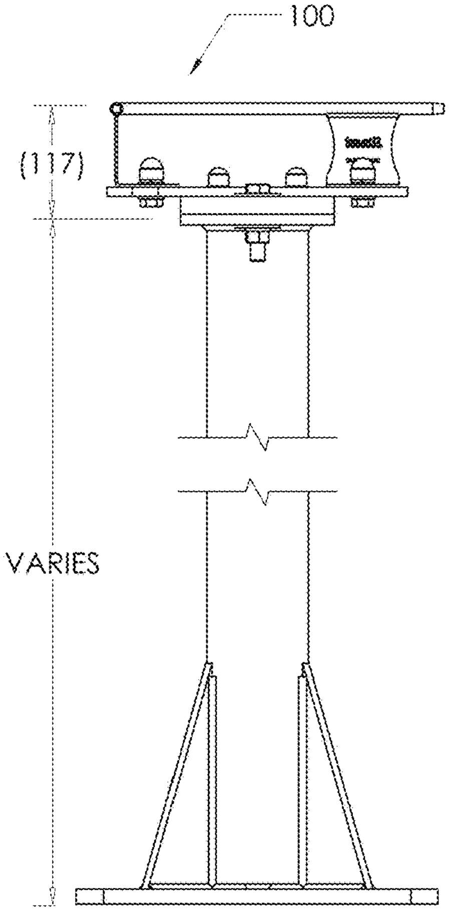

The adaptor plate plurality of accessory fixing holes 122 may be arranged so that the accessory may be attached to the adaptor plate 119 either at 90° or preferably 45° angle increments in the horizontal plane. FIGS. 18-20 provide an exemplary configuration and dimensions of the static line corner assembly.

Figure 21:
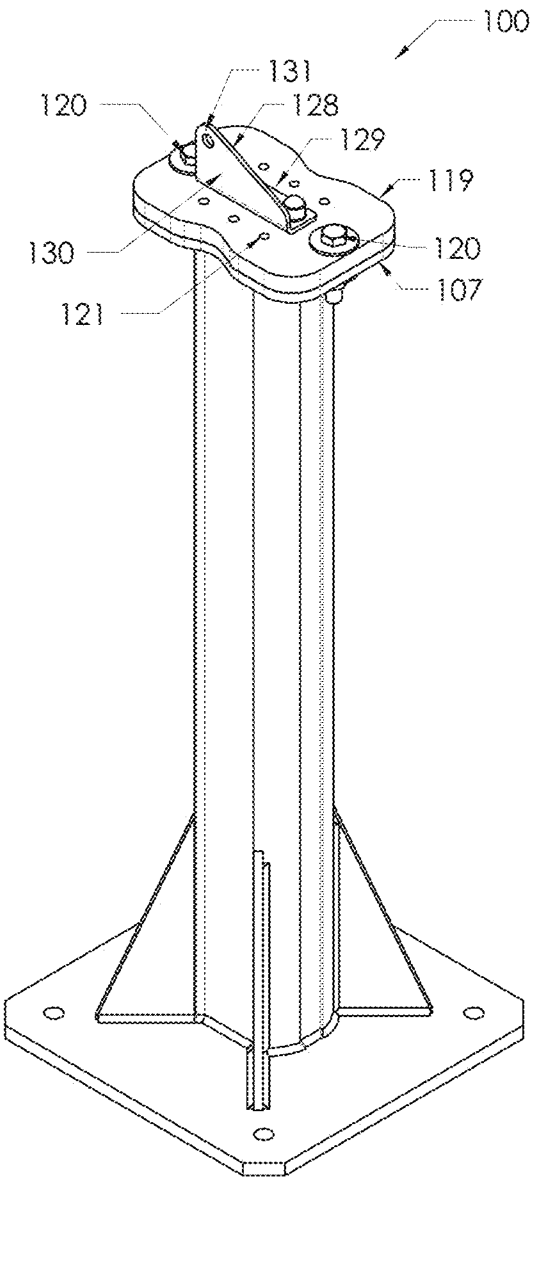
FIG. 21 shows a perspective view of the static line end stanchion bracket configuration.

FIG. 21 shows a perspective view of a static line end stanchion bracket assembly configuration, comprising a stanchion bracket 128 attached to the adaptor plate 119. The stanchion bracket 128 comprises a horizontal planar foot 129 and an orthogonal angled plate 130 extending up from one side thereof, and having an attachment hole 131 at the apex thereof. Attachment of the adaptor plate 119 to the main attachment plate 107 and of the accessory to the adaptor plate 119 is similarly as described above.

Figure 22:
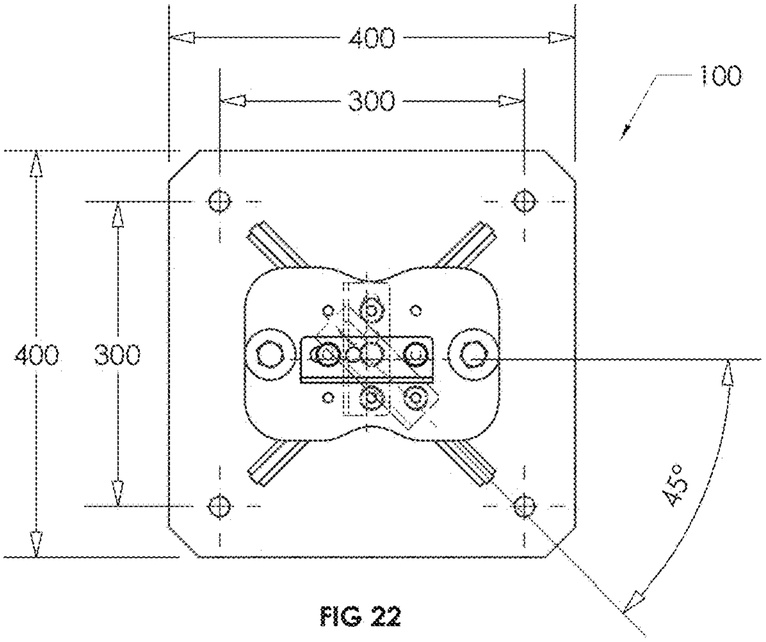
FIGS. 22-24 provide exemplary dimensions of the static line end stanchion bracket assembly.
Figure 23:
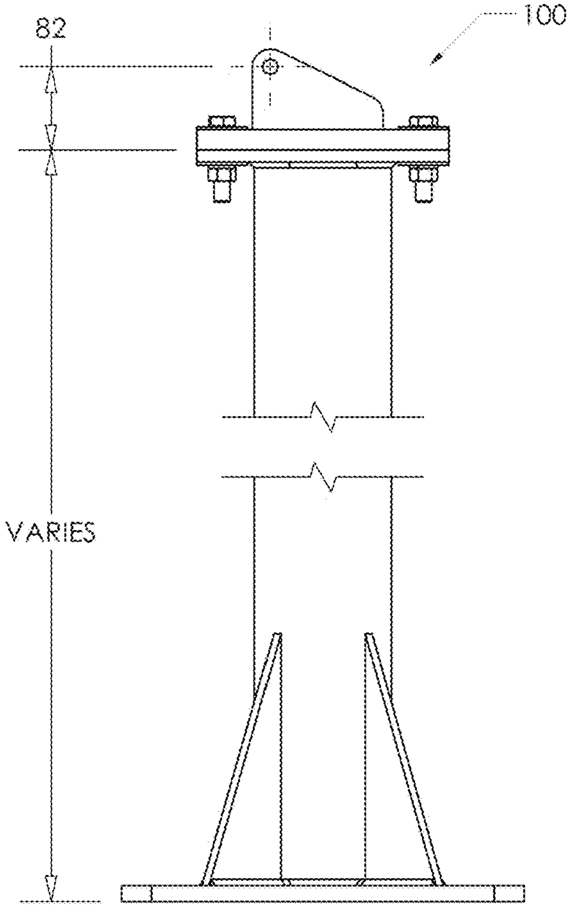
Figure 24:
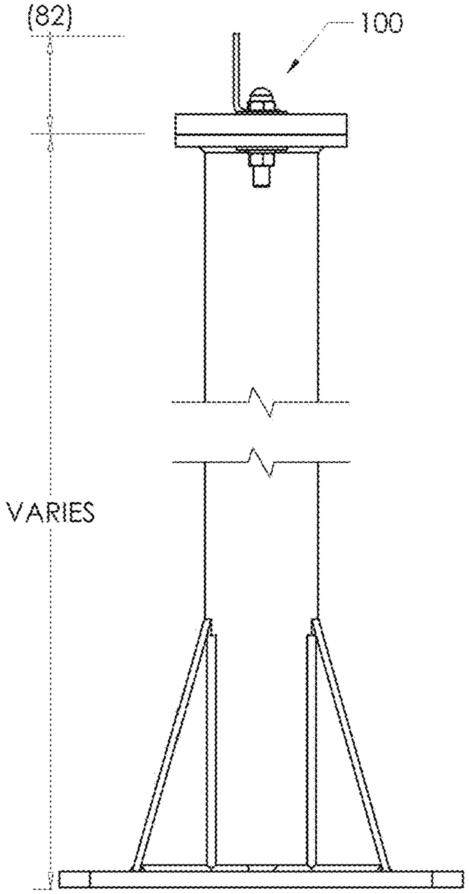

Given the plurality of accessory adaptor plate fixing holes described above, the stanchion bracket 128 may similarly be attached to the adaptor plate 119 at 45° angle increments in the horizontal plane. FIGS. 22-24 provide an exemplary configuration and dimensions of the static line end stanchion bracket assembly.

Figure 25:
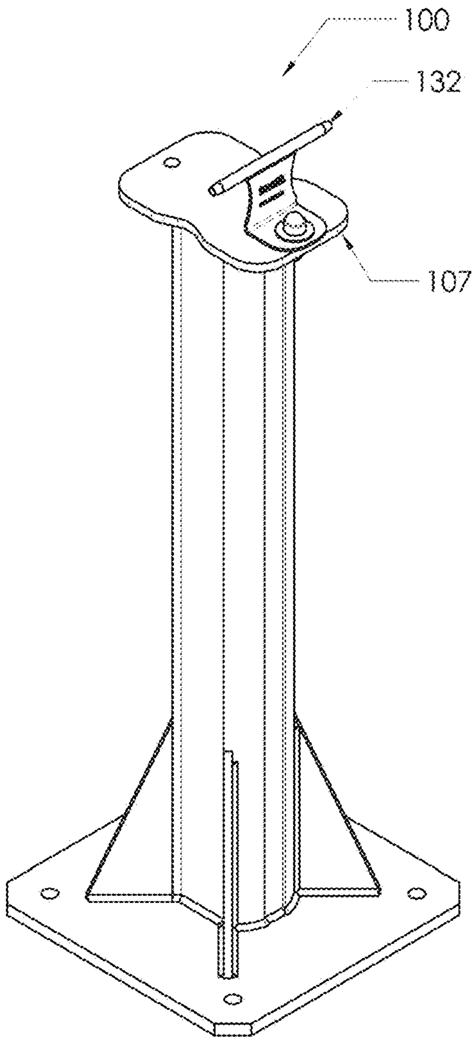
FIGS. 25-27 show perspective and assembly views of the static line intermediate bracket assembly.
Figure 26:
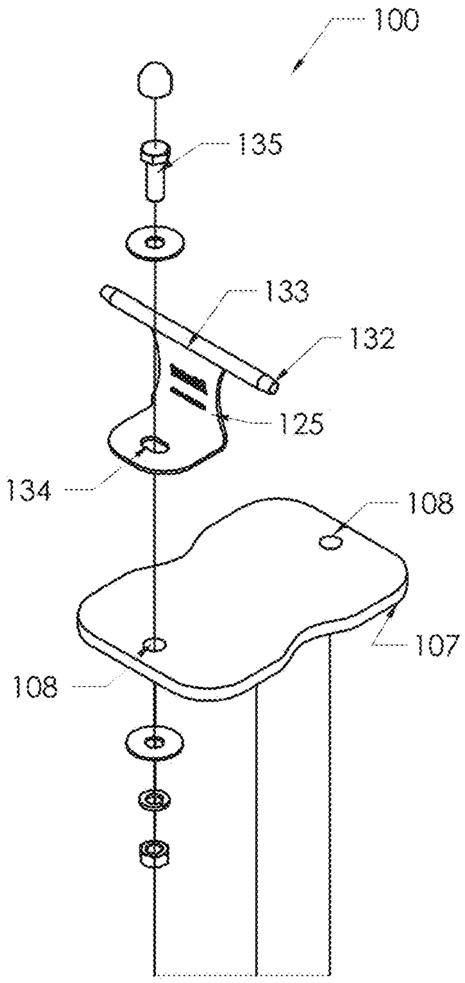
Figure 27:
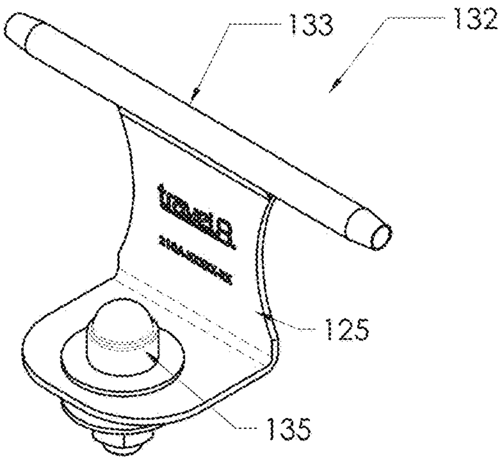

FIGS. 25-27 show perspective and arrangement views of a static line intermediate bracket assembly, in accordance with an embodiment comprising an intermediate bracket 132 attached directly to one of the main attachment plate fixing holes 108 of the main attachment plate 107.

Figure 28:
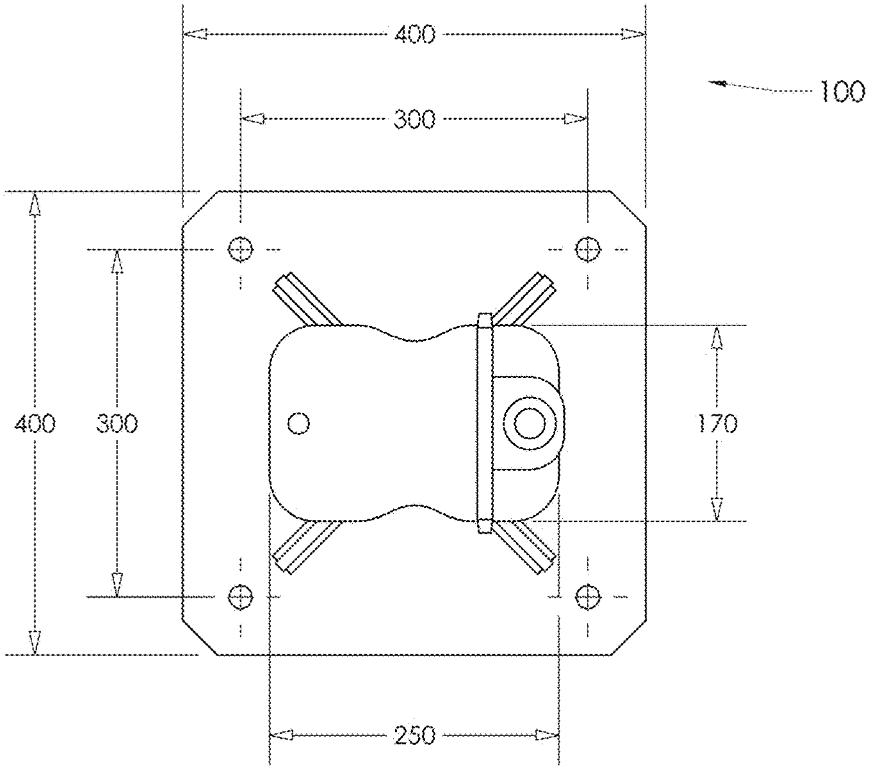
FIGS. 28-30 provide exemplary dimensions of the static line intermediate bracket static line assembly.
Figure 29:
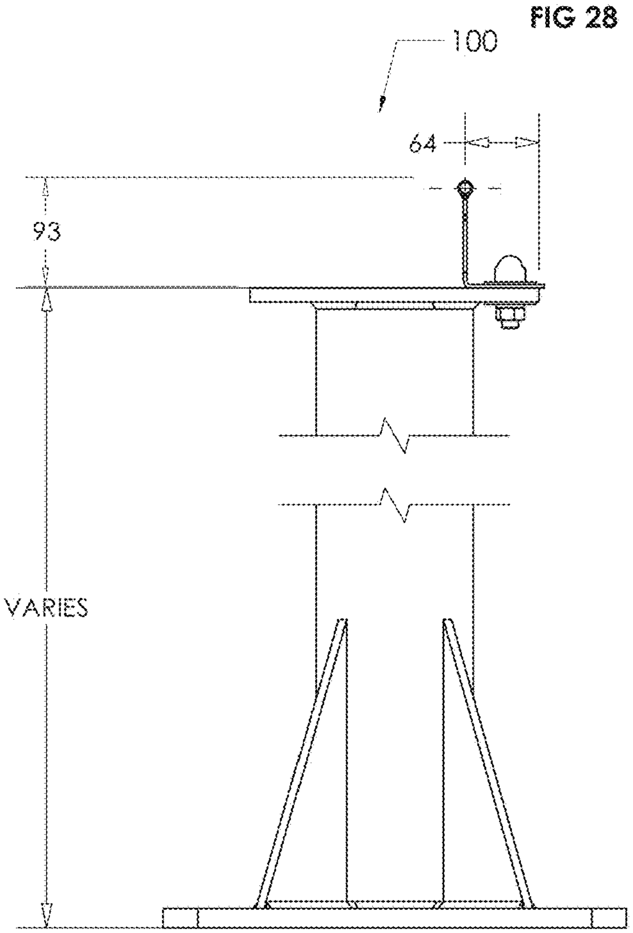
Figure 30:
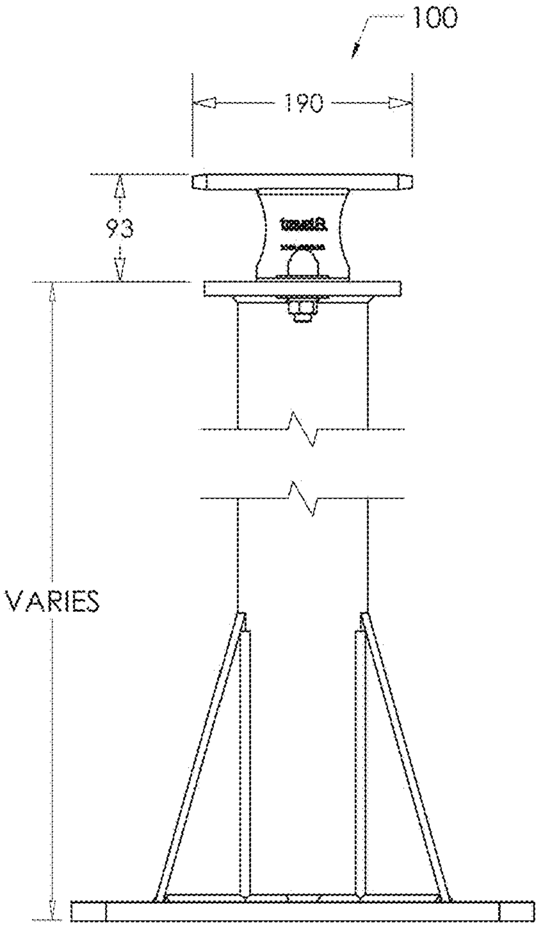

The intermediate bracket 132 comprises a straight rail 133 connected to a right-angled bracket 125 having a frontal fixing hole 134, through which a fastener 135 attaches the intermediate bracket 132 to the main attachment plate 107, by means of a stainless steel bolts and nuts, end cap, flat and spring washers. FIGS. 28-30 provide an exemplary configuration and dimensions of the static line intermediate bracket assembly.

The foregoing description, for purposes of explanation, used specific nomenclature to provide a thorough understanding of the invention. However, it will be apparent to one skilled in the art that specific details are not required in order to practise the invention. Thus, the foregoing descriptions of specific embodiments of the invention are presented for purposes of illustration and description. They are not intended to be exhaustive nor to limit the invention to the precise forms disclosed as obviously many modifications and variations are possible in view of the above teachings. The embodiments were chosen and described in order to best explain the principles of the invention and its practical applications, thereby enabling others skilled in the art to best utilise the invention and various embodiments with various modifications, as are suited to the particular use contemplated. It is intended that the following claims and their equivalents define the scope of the invention.

The term “approximately” or similar as used herein should be construed as being within 10% of the value stated unless otherwise indicated.

The invention claimed is:

1. A structural post for fall arrest and rope access, the post comprising:

a baseplate comprising baseplate fixing holes, a mast attached to an upper surface of the baseplate, and a main attachment plate comprising main attachment plate fixing holes affixed to an upper end of the mast, wherein:

the mast comprises symmetrical planar sides and symmetrical rounded corners therebetween, the rounded corners are concentric and the planar sides are recessed therein, and the planar sides comprise major and minor planar sides.

2. The structural post as claimed in claim 1, wherein the main attachment plate is parallel with the baseplate.

3. The structural post as claimed in claim 1, wherein the main attachment plate comprises two main attachment plate fixing holes.

4. The structural post as claimed in claim 3, wherein a pair of eye-bolts are affixed respectively through the two main attachment plate fixing holes.

5. The structural post as claimed in claim 1, further comprising an accessory and wherein the accessory is attached directly to at least one of the main attachment plate fixing holes.

6. The structural post as claimed in claim 1, wherein the main attachment plate has greater cross-section than that of the mast, such that the main attachment plate fixing holes locate outside the mast in horizontal cross section.

7. The structural post as claimed in claim 1, further comprising a quadrant of gusset plates adjoining an upper surface of the baseplate and the mast.

8. The structural post as claimed in claim 1, wherein the baseplate is square and comprises a quadrant fixing holes at respective corners thereof.

9. The structural post as claimed in claim 1, further comprising an adaptor plate with adaptor plate fixing holes corresponding to the main attachment plate fixing holes and accessory fixing holes so that the adaptor plate can be attached to the main attachment plate using the adaptor plate fixing holes and the main attachment plate fixing holes and an accessory can be attached to the adaptor plate using the accessory fixing holes.

10. The structural post as claimed in claim 9, wherein the main attachment plate comprises two main attachment plate fixing holes and wherein the adaptor plate comprises two adaptor plate fixing holes corresponding to the two main attachment plate fixing holes.

11. The structural post as claimed in claim 9, wherein a plurality of accessory fixing holes are provided in a configuration so that the accessory may be attached to the adapter plate at various angles in a horizontal plane of the adapter plate.

12. The structural post as claimed in claim 11, wherein the configuration allows the accessory to be attached to the adaptor plate at 90° angle increments in the horizontal plane.

13. The structural post as claimed in claim 11, wherein the configuration allows the accessory to be attached to the adaptor plate at 45° angle increments in the horizontal plane.

14. The structural post as claimed in claim 9, further comprising the accessory and wherein the accessory is a static line corner assembly comprising a corner rail.

15. The structural post as claimed in claim 14, wherein the corner rail bends through approximately 90°.

16. The structural post as claimed in claim 14, wherein the corner rail is attached to a flat bar via right-angled brackets.

17. The structural post as claimed in claim 16, wherein the flat bar comprises two central fixing holes for attachment to the adaptor plate and two lateral fixing holes for affixing of the right-angled brackets.

18. The structural post as claimed in claim 9, further comprising the accessory and wherein the accessory is a static line end stanchion bracket assembly configuration comprising a stanchion bracket attached to the adaptor plate, wherein the stanchion bracket comprises a horizontal planar foot and an orthogonal angled plate extending up from one side thereof.

19. The structural post as claimed in claim 18, wherein the orthogonal angled plate has an attachment hole at the apex thereof.

20. The structural post as claimed in claim 9, further comprising the accessory and wherein the accessory is a static line intermediate bracket assembly comprising a straight rail connected to a right-angled bracket.

21. The structural post as claimed in claim 20, wherein the right-angled bracket has a frontal fixing hole, through which a fastener attaches the intermediate bracket.

22. The structural post as claimed in claim 1, wherein the baseplate is attached to a concrete plinth using undercut mechanical sleeved anchor bolts.

23. The structural post as claimed in claim 22, wherein the plinth is at least 300 mm deep.

24. The structural post as claimed in claim 1, wherein the baseplate is attached to a concrete plinth using chemical anchor sleeves.

25. The structural post as claimed in claim 24, wherein the concrete plinth is at least 270 mm deep.

26. The structural post as claimed in claim 1, further comprising a cast-in anchor cage to secure the baseplate.

27. The structural post as claimed in claim 26, wherein the cast-in anchor cage comprises a pair of U-bolts with a pair of planar anchor plates extending therebetween.

28. A structural post for fall arrest and rope access, the post comprising:

a baseplate comprising baseplate fixing holes, a mast attached to an upper surface of the baseplate, and a main attachment plate comprising main attachment plate fixing holes affixed to an upper end of the mast, wherein:

the mast comprises symmetrical planar sides interconnected by symmetrical rounded corners, and the planar sides include major planar sides at first opposite sides of the mast, and minor planar sides at second opposite sides of the mast, wherein the rounded corners join one major planar side with one minor planar side.

* * * * *